INVENTOR
SUSUMU EGAWA
BY Stevens, Davis, Miller & Mosher
ATTORNEYS

INVENTOR
SUSUMU EGAWA

BY Stevens, Davis, Miller & Mosher
ATTORNEYS

INVENTOR

SUSUMU EGAWA

BY Stevens, Davis, Miller & Mosher

ATTORNEYS

United States Patent Office 3,461,341
Patented Aug. 12, 1969

3,461,341
DYNAMIC CONVERGENCE DEVICE FOR THREE ELECTRON GUN COLOR TELEVISION RECEIVER

Susumu Egawa, Osaka, Japan, assignor to Matsushita Electric Industrial Co., Ltd., Osaka, Japan, a corporation of Japan Filed Dec. 11, 1967, Ser. No. 689,551
Int. Cl. H01j 29/50, 31/00, 29/70
U.S. Cl. 315—13 4 Claims

ABSTRACT OF THE DISCLOSURE

A dynamic convergence device for a three-electron-gun color television receiver, which is miniaturized and manufactured at low cost as compared with the conventional devices of this type. In the dynamic convergence device disclosed herein, a pair of convergence assemblies each comprising a core and a coil are positioned symmetrically with respect to the longitudinal axis of a picture tube, one of the convergence assemblies being associated with one of the pole pieces for said picture tube and the other convergence assembly being associated with the remaining two pole pieces, and currents of parabolic waveform flow through said coils.

This invention relates to color television, and more particularly it pertains to a dynamic convergence device for a color television receiver.

It is a primary object of the present invention to provide a simplified dynamic convergence system for color television.

Another object of the present invention is to simplify the convergence yoke assembly associated with the three-electron-gun color picture tube which is commonly used at present, thereby providing such convergence system which is simplified in construction, manufactured at low cost and easily adjusted.

Other objects, features and advantages of this invention will become apparent from the following description taken in conjunction with the accompanying drawings, in which.

Figures 1, 2, 3:
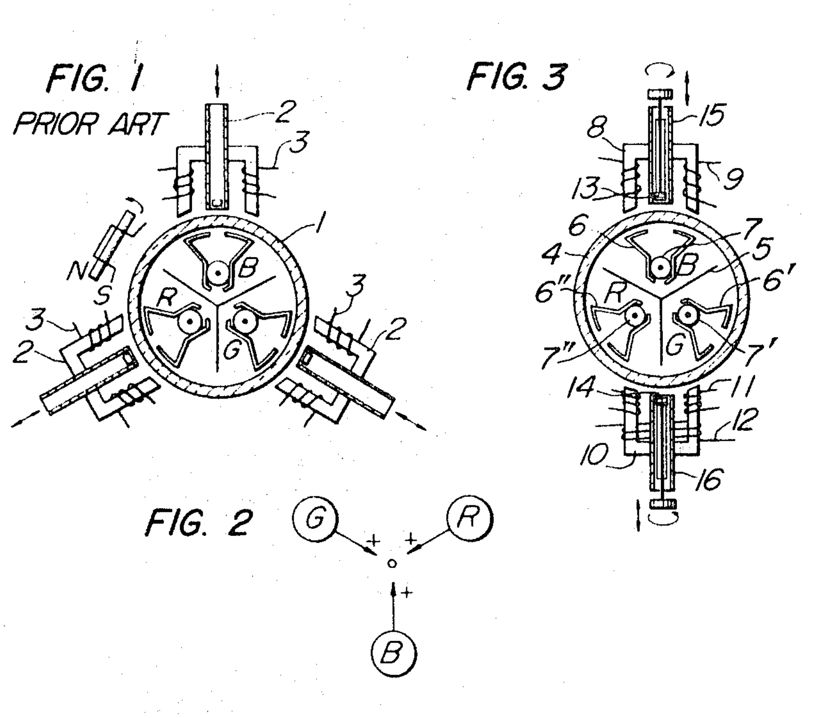
FIG. 1 is a schematic view showing a conventional convergence device for a color television receiver.
FIG. 2 is a view useful for explaining the color-misconvergence and at the same time determining the directions of the currents flowing through the coils.
FIG. 3 is a schematic view showing the dynamic convergence device for a color television receiver according to an embodiment of this invention.
Figure 4A:
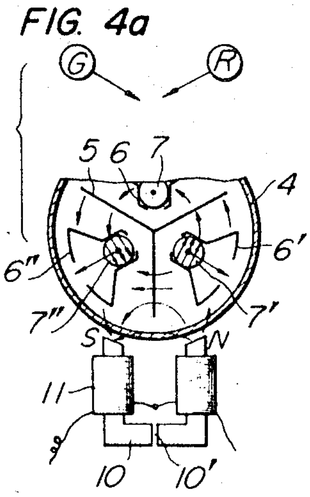
Figure 4B:
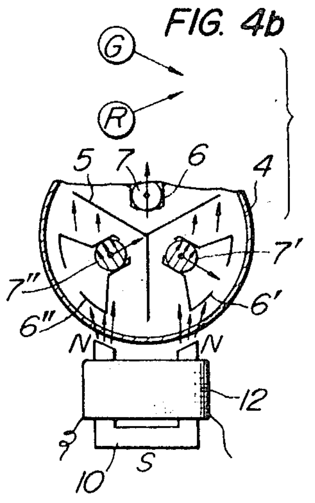
Figure 5:
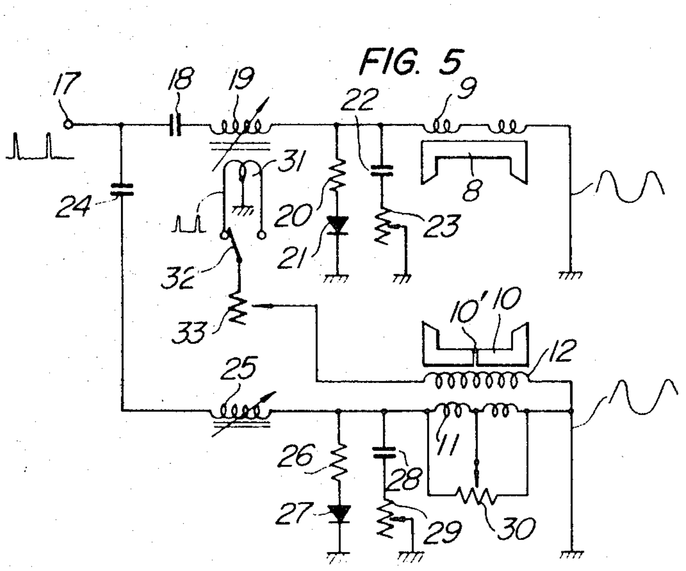
Figure 6:
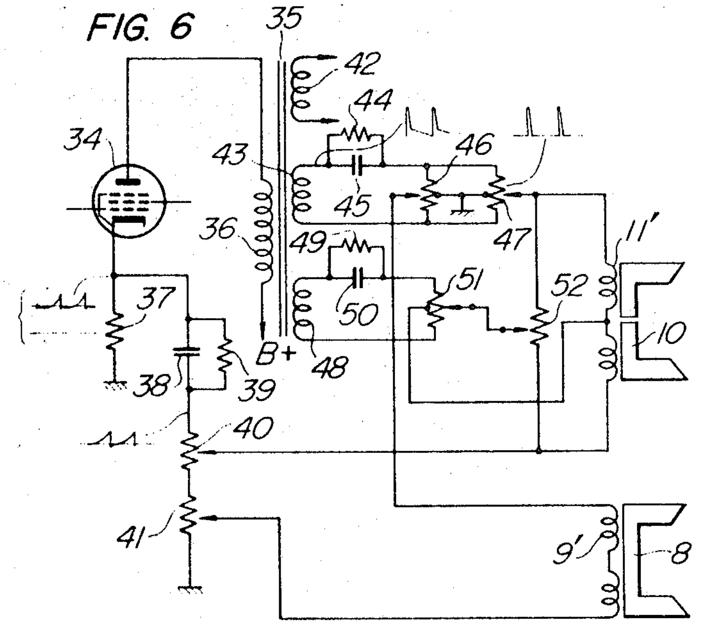

FIGS. 4*a* and 4*b* are views showing examples of the main portion of the device shown in FIG. 3;

FIG. 5 shows an example of the convergence circuit according to this invention; and FIG. 6 shows another example of the convergence device according to this invention.

Figure 7A:
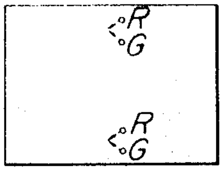
Figure 7B:
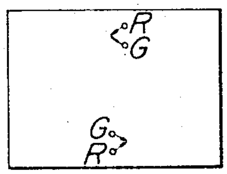
Figure 7C:
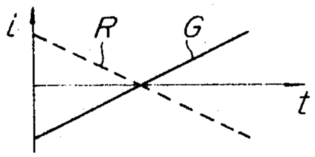

FIGS. 7*a*, 7*b* and 7*c* are views useful for explaining the operation of the device as shown in FIG. 6.

Referring to FIG. 1, there is shown the conventional convergence device, wherein three magnet means 2 are positioned around the neck portion 1 of a picture tube including three electron-guns R, G and B. Static convergence and blue lateral adjustments are effected with respect to the respective primary colors while looking at the center portion of the screen, and thereafter dynamic convergence adjustment is effected by flowing a current of parabolic waveform through each dynamic convergence coil 3. This dynamic convergence adjustment is intended to superimpose the three primary colors upon each other mainly in the peripheral portion of the screen. Misconvergence depends upon the curvatures of the focal plane of each primary color and front plane, and it is approximately corrected with respect to its amount in accordance to the square of the distance from the center of the screen. Thus, parabolic currents at field and line frequency are caused to flow through the coils 3, thereby effecting approximate superposition af the three primary colors in the peripheral portion of the screen. The displacement of beam-dots due to the dynamic convergence is in the radial direction, as can be seen from the drawing. For the convenience of explanation, the positive directions of the respective primary colors R, G and B are determined as indicated in FIG. 2. (In this figure, R, G and B represents the relationship in position between the three color-dots as these color dots are subjected to misconvergence when no dynamic convergence is applied.) Furthermore, a current causing a displacement of each color-dot in the positive direction is referred to as "current in the positive direction" hereinafter. The adjustment procedure will now be described by way of example. First, a vertical adjustment is performed as follows:

(i) A parabolic current of a suitable amplitude (referred to as "AMP" component) is caused to flow through each of the "red" and "green" coils in order to accurately align the "red" and "green" dots in the vertical direction as viewed on a vertical line passing through the center of the screen. In this case, if there is a difference between the amount of correction to be made in the upper portion of the screen and that to be made in the lower portion of the screen, a current of saw-tooth waveform will be required, which is called "TILT" component. Such saw-tooth wave current of suitable amplitude can be formed by applying a pulse voltage to each coil.

(ii) A blue image is superposed upon a yellow image resulting from the alignment of the red and green images effected in the above manner. In this case, too, "AMP" and "TILT" components will be required for the same reason as described above.

(iii) The horizontal adjustment is also effected in the order of RG and B by substantially the same procedure.

In view of the fact that there is a considerable similarity between "red" and green" in respect of the necessary amount of dynamic convergence correction and waveform, the present invention intends to drive "red" and "green" beams by the use of the opposite legs of a single common core provided for the "red" and "green" electron guns, thereby producing substantially the same effect as in the prior art.

This invention will now be described in greater detail with reference to the drawings. FIG. 3 is a view showing the neck portion of a picture tube taken in section in the vicinity of the screen of the picture tube, as viewed toward the electron guns. A Y-shaped shielding plate 5 is provided in the neck portion 4. In the portions surrounded by the tube wall of the neck portion 4 and the shielding plate 5 are provided pole pieces 6, 6', 6'' each formed by a pair of bent metal sheet electrodes disposed in opposing relationship with each other, respectively. Electron guns 7, 7', 7'' are provided in the end portions of the neck portion 4 in such a manner that each of the electron beams therefrom is caused to pass through between the pair of electrodes of each of the pole pieces 6, 6', 6''. The reference numeral 7 represents the "blue" electron gun, 7' the "green" electron gun, and 7'' the "red" electron gun. The above arrangement is the same as that of the conventional picture tube. In accordance with this invention, a U-shaped core 8 is provided in such a manner that the opposite legs thereof are disposed in opposing relationship with the two electrodes forming the pole piece 6 assosiated with the "blue" electron gun 7. Coils 9 are wound on the legs of the core 8. Also, another U-shaped core 10 is provided in such a manner that the opposite legs thereof are disposed in opposing relationship with the adjacent ones of the electrodes constituting the pole pieces 6′ and 6″ associated with the "green" and "red" electron guns 7′ and 7″. "AMP" coils 11 and a "differential" coil 12 are wound on the legs of the core 10. The "AMP" coils are separately wound on the respective legs of the core 10 and connected in series with each other, while the "differential" coil is wound in such a manner as to surround both legs of the core 10. In FIG. 3, there are shown static convergence magnets 13 and 14, iron pieces 15 and 16 for producing a radial magnetic field, and the like. These elements constitute a novel dipole static convergence device. But they have no direct relation with the present invention, and therefore description thereof will be omitted.

Description will now be made of the operation of the device according to this invention. The coils 9 wound on the opposite legs of the core 8 are connected in series with each other, and a parabolic current is caused to flow through each of the coils, so that correction in the upper and lower portions of the screen is effected.

Since the "red" electron gun 7″ and the "green" electron gun 7′ are arranged in the same horizontal plane, the "red" and "green" beam spots prior to being subjected to dynamic convergence are horizontally spaced apart from each other, as shown in FIG. 2. By flowing a parabolic current through the "AMP" coil 11 as shown in FIG. 4*a*, it is possible to bring these beam spots into approximate register with each other. The vertical misconvergence occurring after the correction just described can be corrected by flowing a parabolic current through the "differential" coil 12 so that both legs of the core 10 having the coil 12 wound thereon are magnetized in the same polarity so as to correct the "red" beam in the negative direction and the "green" beam in the positive direction, as shown in FIG. 4*b*.

The present device may be incorporated in the horizontal convergence circuit, as shown in FIG. 5. In FIG. 5, the reference numeral 17 represents a fly-back pulse input terminal connected with a secondary winding of a horizontal output transformer coupled to a horizontal output tube. The input terminal 17 is connected with one end of the convergence coil 9 (see FIG. 3) through a series circuit consisting of a capacitor 18 and a "blue" righward adjustment coil 19. The other end of the coil 9 is grounded. A series circuit consisting of a resistor 20 and diode 21 and a series circuit consisting of a capacitor 22 and variable resistor 23 are inserted between the connection point between the coils 9 and 19 and the ground.

The input terminal 17 is also connected with one end of the "AMP" coil 11 (see FIG. 3) through a series circuit of a capacitor 24 and a "red and green" rightward adjustment coil 25. The other end of the coil 11 is grounded. Between the connection point between the "AMP" coil 11 and the adjustment coil 25 and the ground are inserted a series circuit consisting of a resistor 26 and diode 27 and a series circuit consisting of a capacitor 28 and a variable resistor 29. A variable resistor 30 has its fixed terminals connected with the opposite ends of the "AMP" coil 11 and its movable terminal connected with the connection point between the two coil sections constituting the "AMP" coil 11. The adjustment coil 19 forms a transformer of which the secondary winding 31 has its opposite ends connected with the fixed contacts of a change-over switch 32. The movable contact of the switch 32 is connected with one end of the "differential" coil 12 (see FIG. 3) through a variable resistor 33. The other end of the coil 12 is grounded. Fly-back pulses applied to the input terminal 17 are integrated so that a parabolic current flows through the yoke coils 9 and 11, as shown in FIG. 5. Thus, the horizontal correction is effected. In this case, pulses are induced in the secondary winding 31 associated with the adjustment coil 19, as shown in FIG. 5. Such induced pulses are applied to the "differential" coil 12 so that a saw-tooth wave current flows therethrough to effect correction. By changing the polarity of the pulses applied to the "differential" coil 12 by means of the switch 32, the magnetization of the core 10 shown in FIG. 4*b* is reversed, whereby the direction of correction can be reversed. Such correction can also be effected by moving the movable terminal of the variable resistor 30.

The core 10 is formed with a gap 10′ in its center portion. This gap 10′ serves to increase the "differential" component in the "differential" adjustment by the variable resistor 30. That is, in the case of an integral core, there is a tendency that the intensities of magnetization in the opposite legs thereof assume an average value if there is a difference in ampere-turn between the left and right coil sections of the coil wound on such integral core. By forming the gap in the center portion of the core 10, the coupling between the two coil sections of the coil 11 can be weakened so that the "differential" component can be increased.

Description will now be made of the vertical convergence device with reference to FIG. 6. A vertical output tube 34 has the plate thereof connected with a primary winding 36 of a vertical output transformer 35 and the cathode thereof grounded through a resistor 37. The cathode is also connected with a variable resistor 40 through a parallel circuit consisting of a capacitor 38 and resistor 39. The other end of the variable resistor 40 is grounded through a variable resistor 41.

The secondary winding 42 of the vertical output transformer 35 is connected with a deflecting circuit (not shown), and a third winding 43 is connected with the opposite fixed terminals of a variable resistor 46 through a parallel circuit of a resistor 44 and capacitor 45. A variable resistor 47 is connected in parallel with the variable resistor 46, and the intermediate terminals of the variable resistors 46 and 47 are grounded. The movable terminal of the variable resistor 46 is connected with the movable terminal of the variable resistor 41 through a convergence coil 9′. The movable terminal of the variable resistor 47 is connected with the movable terminal of the variable resistor 40 through an "AMP" coil 11′.

The opposite ends of a fourth winding 48 of the vertical output transformer 35 are connected with the opposite terminals of a variable resistor 51 through a parallel circuit of a resistor 49 and capacitor 50, and the intermediate terminal of the variable resistor 51 is connected directly with the connection point between the two coil sections forming the "AMP" coil 11′. The movable terminal of the variable resistor 51 is connected with the movable terminal of a variable resistor 52 connected in parallel with the "AMP" coil 11′.

From the third winding of the vertical output transformer 35 are taken out such pulses with an oblique portion as shown in the drawing, which are in turn supplied to the parallel circuit of the resistor 44 and capacitor 45 so that they have their oblique portions removed so as to be converted to linear pulses. Such linear pulses are applied to the coil 11′ so that a saw-tooth wave current flows therethrough. At the cathode of the vertical output tube is produced such a voltage as shown in the drawing, which is in turn applied to the parallel circuit consisting of the capacitor 38 and resistor 39 to control the D.C. component so that the dynamic convergence current with respect to the center portion of the picture tube becomes zero. The voltage is then applied to the yoke coil to cause a parabolic current to flow therethrough. Thus, the vertical correction can be effected.

In this vertical convergence device, no differential coil is provided, but the same function is achieved by means of the variable resistors 51 and 52. The operation will now be described. In case the "red" and "green" beam spots R and G are scattered as shown in FIG. 7*a*, the correction therefor is effected by means of the variable resistor 52. That is, the variable resistor 52 is adjusted so that the current flowing through one of the two coil sections forming the coil 11' is increased while the current flowing through the other coil section is decreased, thus bringing the beam spots R and G into register with each other.

If there occurs such misconvergence as shown in FIG. 7*b*, it can be corrected by flowing a saw-tooth wave current of opposite polarity through the two coil sections of the coil 11', as shown in FIG. 7*c*. To this end, a pulse voltage is taken out of the winding 48, and its amount and polarity is controlled by means of the variable resistor 51.

What is claimed is:

1. A dynamic convergence device for a color television receiver having a triple-gun color picture tube provided with three pole pieces positioned inside the neck portion of said color picture tube symmetrically to one another and with respect to the axis of said color picture tube, a first U-shaped core provided outside said neck portion and having its opening portion cooperatively associated with one of said pole pieces, a second U-shaped core provided symmetrically to said first U-shaped core with respect to the axis of said color picture tube and having its opening portion cooperatively associated with the other two pole pieces, dynamic convergence coils wound on the respective legs of each of said U-shaped cores, connected in series with each other and supplied with an electric current of a parabolic waveform, and a differential coil wound to encircle both of the legs of said second U-shaped core and supplied with an electric current of a parabolic waveform.

2. A dynamic convergence device for a color television receiver as set forth in claim 1, wherein a saw-tooth wave current produced by a vertical output tube is supplied to one end of the dynamic convergence coil wound on said second core, and pulses provided by a vertical output transformer are applied to the other end of said coil.

3. A dynamic convergence device for a color television receiver as set forth in claim 1, wherein the dynamic convergence coil wound on the second U-shaped core is provided with a center tap, and a variable resistor is connected across the opposite ends of said dynamic convergence coil, the movable terminal of said variable resistor being connected with said center tap.

4. A dynamic convergence device for a color television receiver as set forth in claim 1, wherein a fly-back pulses are applied to the differential coil through a polarity changing-over switch.

References Cited

UNITED STATES PATENTS

| | | | |
|---|---|---|---|
| 2,672,574 | 3/1954 | Evans | 315—13 |
| 2,855,542 | 10/1958 | Schade | 315—13 |
| 2,875,374 | 2/1959 | Cooper et al. | 315—13 |
| 2,903,622 | 9/1959 | Schopp | 315—13 X |
| 2,907,915 | 10/1959 | Gleichauf | 315—13 |

RODNEY D. BENNETT, Primary Examiner

MALCOLM F. HUBLER, Assistant Examiner

U.S. Cl. X.R.

313—77